W. H. OBITTS.
CHEESE VAT.
No. 109,541. Patented Nov. 22, 1870.
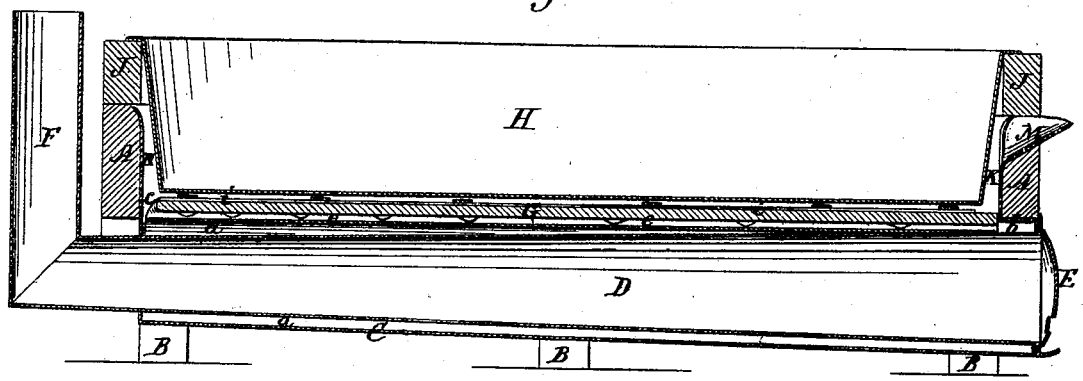
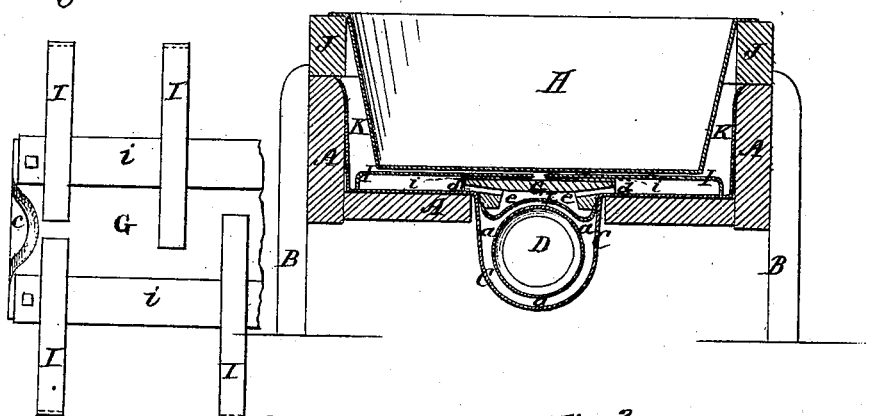
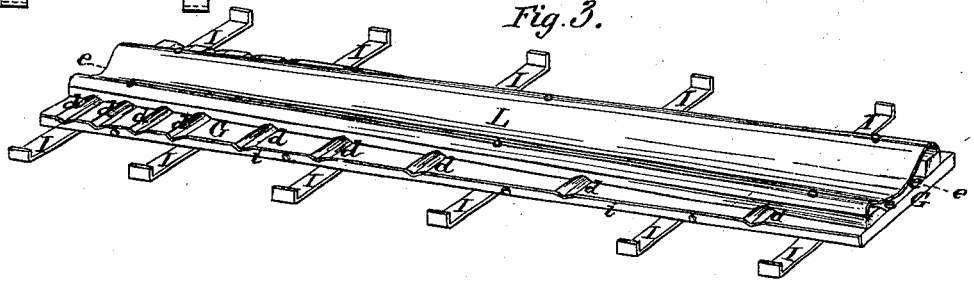
Witnesses.
J. W. Hamilton Johnson
T. S. Genin
William H. Obitts, Inventor
By his Attorneys,
Upperman & Johnson

United States Patent Office.

WILLIAM H. OBITTS, OF ELYRIA, OHIO.

Letters Patent No. 109,541, dated November 22, 1870.

IMPROVEMENT IN CHEESE-VATS.

The Schedule referred to in these Letters Patent and making part of the same.

*To all whom it may concern:*

Be it known that I, WILLIAM H. OBITTS, of Elyria, in the county of Lorain and State of Ohio, have invented certain new and useful Improvements in Cheese-Vats; and I do hereby declare that the following is a full, clear, and exact description thereof, reference being had to the accompanying drawing of the same, which makes part of this specification, and in which—

Figure 1 represents a vertical longitudinal section of a cheese-vat embracing my improvements;

Figure 2 represents a transverse section of the same; and

Figure 3 represents a view in perspective of the central circulating and heat-distributing chamber detached from the vat and inverted.

Figure 4 represents a top view of a portion of the distributing-chamber.

My invention relates to vats for making cheese, and consists in providing the water-tank with a central longitudinal board, having on its under side a heating and distributing-chamber, arranged so as to communicate, by an ingress opening, with the heating-chamber of the stove, and by an egress opening with the tank-chamber above; provided also with a series of transverse channels, arranged so as to communicate with said central chamber and the water-tank in lateral streams along the entire length of both sides of said chamber; also, in constructing said central longitudinal board with heat-retaining strips, and a series of transverse arms, arranged so as to allow a free and unobstructed circulation of the water beneath the arms and the entire surface of the cooking-vat without touching the bottom of the latter, whereby the hot water is more evenly and regularly distributed from the central heating-chamber, and the same degree of heat imparted at the same moment to every part of the bottom and sides of the vat, the important desideratum in the manufacture of cheese being to impart to the body of the milk or curd the same degree of heat, and to continue it uniformly throughout the process not only increases its bulk from a given quantity of curd, but improves its quality, renders it firmer, and preserves it for a longer time than when otherwise made.

In the accompanying drawing—

A represents the water-tank or vat of oblong form, lined with tin, and supported upon legs B. It is made with a longitudinal case or trough, C, extending along its center from one end to the other below and opening into the bottom of the tank, within which the heating-pipe D is placed and secured at each end of the tank, so as to leave a free space, *a*, between it and the case for the circulation of the water round and above it.

The open case and its heating-pipe have a tapering form from the front to the back, and the latter is provided with a door, E, at its front, and a smoke-pipe, F, at its rear end.

A central board, G, having a width sufficient to cover the opening of the case C, rests along its edges upon the bottom of the water-tank. On the under side of this central strip a distributing-chamber, *e*, is formed, extending from the front to the rear end of the tank, and communicating at its front end by an opening, *b*, fig. 1, with the water-chamber *a* surrounding the stove, and with the chamber of the water-tank by an opening, *c*, in the board G at its rear end, as shown in fig. 4.

This distributing-chamber projects throughout its length into the heating-chamber *a*, and its under side L is made concave, to conform to the surface of the heating-pipe D, but leaving a space between them for the free circulation of the hot water beneath the central chamber *e* as well as through it.

The front end of the board G fits against the inner side of the tank, and thus closes it with the latter for the purpose of compelling the water from the heater to pass into and through the distributing-chamber *e* and enter the tank at its opposite end.

To effect the distribution of the hot water into the tank along its entire length and beneath the bottom of the vat from opposite sides of the chamber *e*, transverse channels *d* are formed on the under side of the central board G, in communication with the central chamber *e*, so that the hot water, while passing through it, also passes in lateral streams throughout its length directly into the body of the water beneath the vat H, in such manner that the heated water from the supply-chamber *e* is introduced into the tank at all parts at the same temperature and at the same time, because, when the heat from the stove is sufficient to heat the water surrounding it, the latter will at once commence to pass through the supply-chamber *e* and out of the lateral channels *d*, and so increase in the rapidity of its circulation in proportion to the increase of its temperature, and in this manner accomplish the uniform cooking of the curd.

The distributing-channels *d* may be any suitable distance apart, but I prefer to make them closer together toward the rear end of the chamber *e*, to compensate for the loss of heat in the water in its passage through said chamber.

Along each edge of the central board G, and overlapping its top a short distance, a strip of tin, *i*, figs. 2 and 3, is secured to serve as a heat-retainer, and at suitable intervals throughout its length transverse metallic arms I are secured to its upper side, extending nearly to the inner sides of the tank, and bent down so as to rest on the surface thereof, for the purpose of forming a series of heating-arms to maintain the uniformity of heat distributed from the central chamber e, and allow the hot water to pass readily beneath and above them from the rear to the front end of the tank, as they interpose no hindering surface to either the lateral or longitudinal currents of the water.

The curd-vat H is supported by the frame J upon the top of the water-tank, and projects into the latter so as to leave a space, K, between it and the sides and bottom of the tank, so that, while no part of the bottom of the vat rests upon the heating-arms, it is in such proximity thereto as to derive all the benefit they have as heaters, thus relieving the bottom of the vat from all liability to bake or burn any part of the curd.

The water is supplied to the tank at the spout M, or by any other means.

Having thus described my improvements,

I claim—

1. The circulating and distributing-chamber e formed within a central board, G, having an ingress and egress-opening, b c, at opposite ends, and transverse channels d, and arranged in such relation to the tank H and heating-chamber a as to communicate with them in the manner and for the purpose described.

2. The heat-retaining arms 1 and plates i arranged upon the central board G, to assist in equalizing the heat of the water in the tank, in the manner described.

3. The concave bottom of the distributing-chamber e, arranged to project within the heating-chamber a, to obtain a greater heating surface, as described.

WILLIAM H. OBITTS.

Witnesses:
JOHN V. COON,
N. L. JOHNSON.